June 24, 1941.  H. KATTWINKEL  2,247,298
MULTIPLE DISK BRAKES, COUPLINGS, AND THE LIKE
Filed Sept. 14, 1938
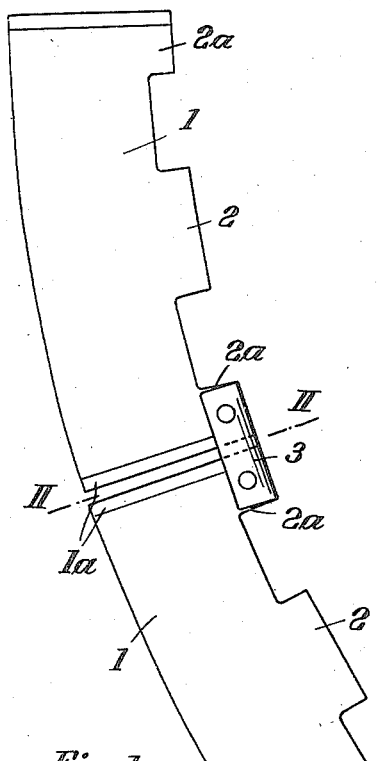
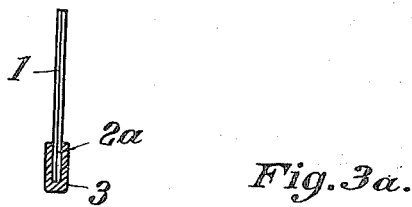
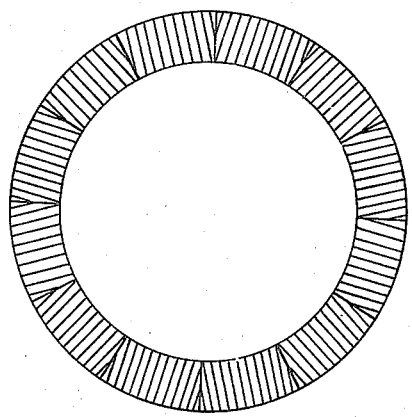
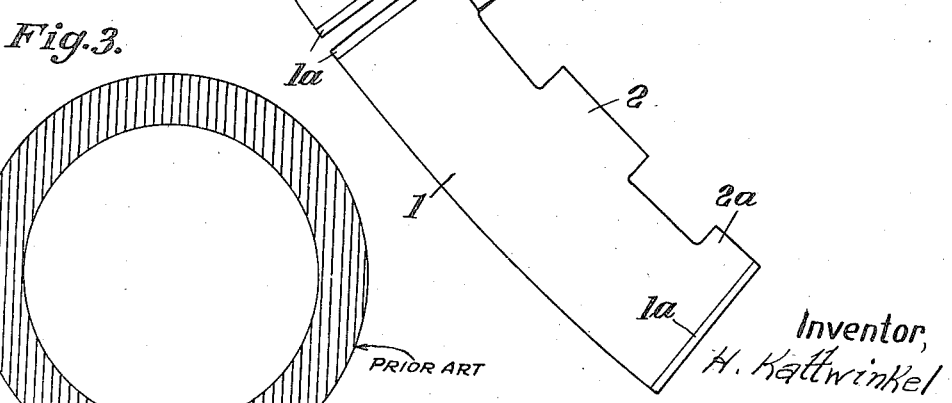
Inventor,
H. Kattwinkel
By Glascock Downing & Seebohm
Attorneys.

Patented June 24, 1941

2,247,298

UNITED STATES PATENT OFFICE 2,247,298

MULTIPLE DISK BRAKE, COUPLING, AND THE LIKE

Hans Kattwinkel, Radebeul, Germany

Application September 14, 1938, Serial No. 229,959
In Germany September 29, 1937

5 Claims. (Cl. 192—107)

This invention relates to laminated brakes, couplings and the like and more particularly to a special formation of the ring-shaped disks which usually consist of sheet steel and which act either directly as frictional disks or as carriers for the frictional linings proper which are made of special frictional material, for instance asbestos bound by an artificial resin or the like. The invention is of special importance for annular friction disks of large diameter and small radial width, such as are used for the multiple disk brakes of heavy, high-speed vehicles, more particularly railway vehicles.

The main difficulty in the manufacture of such annular disks and in the operation of the brakes and couplings furnished with them resides in making them as flat as possible and keeping them permanently in this state. More particularly the latter is practically impossible, owing to the warping of the disks caused by the great amount of heat developed during operation. Even the provision of radial slots in the disks does not overcome this disadvantage. When the disks are not exactly flat, the release of the particular brake or coupling entails considerable motion of the disengaging member and this necessitates such a great axial overall length that brakes or couplings of this kind are practically out of the question for many purposes, more particularly for use with road and rail vehicles.

In the annual disk forming the subject matter of the present invention these disadvantages are overcome through the disk being composed of a large number of separate pieces which can themselves be easily made perfectly flat and which are united by suitable connecting pieces to form a relatively rigid annular structure. The connecting pieces consist preferably of welted pieces of sheet metal, which are slipped over the surface of the guiding lugs of adjacent disk sectors and are welded or riveted to them.

In the drawing which illustrates the invention as applied to an inwardly toothed bare annular disk for a multidisk brake of great diameter.

Fig. 1 shows a portion of the annular disk in side elevation, whilst

Fig. 2 is a section on line II—II of Fig. 1.

Figs. 3 and 3a show details.

The portion of disk shown in Fig. 1 comprises three annular sectors I which are separately stamped out of sheet steel. The teeth or lugs 2 which serve as a guide in the longitudinal grooves of the disk support are stamped out at the same time, each sector I in the present instance having a middle lug 2 and two end lugs 2a, the combined width of which for each two adjacent sectors is less than the width of the lugs 2 by an amount corresponding to the width of the separating gaps between the sectors I. At the edges adjacent to the separating gaps the sectors I, as indicated at Ia, are bevelled off, in order that the friction lining of the opposite disks shall not catch in the separating gaps.

Over each two adjacent lugs 2a a sheet metal element 3 bent to the shape of a U is slipped, the length of which corresponds to the width of the lugs 2. The sheet metal elements are rigidly connected with the lugs 2a, preferably by spot welding. This may be effected by mechanical means, the sectors I which are arranged next to one another in the form of a circle being placed on a flat base plate, so that, after welding, the ring-shaped structure composed of sectors I, which can be used as such as a bare disk of the brake in question, will be perfectly flat. The warping which frequently occurs in one-piece sheet metal annular disks in consequence of heat stresses in operation, more particularly the forming of the so-called hat-brim shape with the consequent one-sided wear of the friction linings, can no longer occur and with the new construction of the disk the latter can neither warp as a whole nor will the individual sectors themselves become distorted. This is to be accounted for on the one hand by the rigid connection by means of the U-shaped connecting elements 3 which provide a considerable resisting moment against bending stresses and on the other hand by the circumstance that the sectors I, in contradistinction to the sheet material of the disks stamped in the usual way in one piece out of a correspondingly large metal sheet show over the whole periphery a uniform direction of the fibres produced by rolling, as is illustrated by way of comparison in Figs. 3 and 3a, of which the former illustrates the direction of the rolling fibres in an annular disk stamped according to the usual method out of the full sheet, whilst Fig. 3a shows in a disk built up in accordance with the invention, that the individual sectors are exactly alike as regards the direction of the fibres.

A further advantage of the new disk consists in this, that the connecting elements 3 which, as already stated, also serve for guiding the disk in the longitudinal grooves of the disk carrier or driver, bear with considerably greater side surfaces against the side wall of these grooves, so that the danger of the edges of the guiding teeth being hammered out in width or the grooves being knocked open, as may occur more particularly through sudden stresses and frequent change of direction of rotation with the sheet metal disks as hitherto in use, no longer exists.

The counter disks coacting with the bare disks illustrated may be made in the same way, with the exception that they need only be covered with frictional material on the opposite sides, which may be carried out in a known manner, for instance by riveting it on or by pressing it into holes provided in the sheet metal sectors.

What I claim is:

1. An annular disk for friction couplings, brakes and the like comprising a plurality of separately made plane ring-shaped sectors of sheet metal having their adjacent ends closely spaced, lugs projecting radially from the adjacent ends of each two sectors, and means for rigidly connecting the lugs at the ends of each two sectors and uniting said sectors to form a unitary self-supporting sub-divided annular body.

2. An annular disk for friction couplings, brakes and the like comprising a plurality of separately made plane ring-shaped sectors of sheet metal having their adjacent ends closely spaced, lugs projecting radially from the adjacent ends of each two sectors, and a plurality of connecting pieces bridging and rigidly connecting the lugs at the adjacent ends of each two sectors and uniting the sectors to form a unitary self-supporting sub-divided annular body.

3. An annular disk for friction couplings, brakes and the like comprising a plurality of separately made plane ring-shaped sectors of sheet metal having their adjacent ends closely spaced, lugs projecting radially from the adjacent ends of each two sectors, and a connecting piece rigidly connecting the lugs at the ends of each two sectors and uniting said sectors to form a unitary self-supporting sub-divided annular body, said connecting pieces being formed of folded sheet metal and embracing said lugs, and additional radial lugs formed medially of said sectors having a greater peripheral extension than the first mentioned lugs and the peripheral extension of said connecting pieces not substantially exceeding that of said additional lugs.

4. Annular disk for friction couplings, brakes and the like comprising a plurality of separately made plane ring-shaped sectors of sheet metal, two adjacent sectors leaving a joint between them, two connecting lugs radially projecting from each sector adjacent to the joints, and means for rigidly connecting two adjacent lugs comprising rigid connecting pieces bridging over the said two lugs of different sectors adjacent to one joint.

5. Annular disk for friction couplings, brakes and the like comprising a plurality of separately made plane ring-shaped sectors of sheet metal, two adjacent sectors leaving a joint between them, two lugs projecting radially from each sector adjacent to the said joints, a rigid connecting piece bridging over the said two lugs of different sectors adjacent to one joint, said connecting pieces being constructed as sheet metal folds and each connecting piece engaging radially over two connecting lugs projecting from the sectors adjacent to the same joint.

HANS KATTWINKEL.